(12) United States Patent
Lee et al.

(10) Patent No.: US 8,555,507 B2
(45) Date of Patent: Oct. 15, 2013

(54) METHOD FOR FABRICATING A MEMBER OF A VEHICLE

(75) Inventors: Mun Yong Lee, Pusan (KR);
Byung-Hun Jung, Pusan (KR);
Chung-Yun Kang, Pusan (KR); Tae-Il Kim, Pusan (KR)

(73) Assignees: Sungwoo Hitech Co., Ltd., Pusan (KR);
Pusan National University Industry-University Cooperation Foundation, Pusan (KR)

( * ) Notice: Subject to any disclaimer, the term of this patent is extended or adjusted under 35 U.S.C. 154(b) by 1114 days.

(21) Appl. No.: 12/509,569

(22) Filed: Jul. 27, 2009

(65) Prior Publication Data

US 2011/0016719 A1 Jan. 27, 2011

(30) Foreign Application Priority Data

Jul. 21, 2009 (KR) ........................ 10-2009-0066400

(51) Int. Cl.
*B21D 53/88* (2006.01)
*C22C 38/00* (2006.01)
*C21D 7/13* (2006.01)

(52) U.S. Cl.
USPC .......... 29/897.2; 29/428; 72/342.2; 72/342.6; 72/364; 72/700; 148/330; 148/644

(58) Field of Classification Search
USPC ............. 29/897, 897.2, 428; 72/342.1, 342.2, 72/342.5, 342.6, 342.94, 342.96, 364, 72/700; 76/107.1; 148/330, 644, 650–664; 296/133, 154, 193.05, 203.03, 187.03, 296/187.09

See application file for complete search history.

(56) References Cited

U.S. PATENT DOCUMENTS

| | | | |
|---|---|---|---|
| 7,475,478 B2 * | 1/2009 | McCrink et al. | 29/897.2 |
| 8,307,680 B2 * | 11/2012 | Drillet et al. | 72/47 |
| 2009/0320547 A1 * | 12/2009 | Horton et al. | 72/342.3 |
| 2011/0165436 A1 * | 7/2011 | Drillet et al. | 428/653 |

FOREIGN PATENT DOCUMENTS

| | | |
|---|---|---|
| JP | 2000-144238 | 5/2000 |
| JP | 2000-248338 | 9/2000 |
| JP | 2002-120755 | 4/2002 |
| JP | 2003-095132 | 4/2003 |
| JP | 2003-268489 | 9/2003 |
| JP | 2006-213959 | 8/2006 |
| JP | 2009-019229 | 1/2009 |
| JP | 2010-236560 | 10/2010 |
| KR | 10-0765723 | 10/2007 |

* cited by examiner

*Primary Examiner* — Sarang Afzali
(74) *Attorney, Agent, or Firm* — Lexyoume IP Meister, PLLC.

(57) ABSTRACT

As to the method for fabricating a member of a vehicle, after a member for the vehicle having high-rigidity of martensite organization is fabricated by a hot stamping forming, the martensite organization is transformed to a ferrite having a low-rigidity partially and improved toughness or to a metal organization heat treated by tempering process through induction heating or secondary heat treatment using laser beam of conduction area, and thereby collision absorption performance is improved by stabilizing the absorption directivity of the collision energy without additional reinforcement.

14 Claims, 8 Drawing Sheets

METHOD FOR FABRICATING A MEMBER OF A VEHICLE

CROSS-REFERENCE TO RELATED APPLICATION

This application claims priority to and the benefit of Korean Patent Application No. 10-2009-66400 filed in the Korean Intellectual Property Office on Jul. 21, 2009, the entire contents of which are incorporated herein by reference.

BACKGROUND OF THE INVENTION (a) Field of the Invention

The present invention relates to a method for fabricating a member of vehicle and a side member produced by the same, and more particularly to a method for fabricating a member of vehicle and a side member produced by the same so as to stabilize an absorption directivity of collision energy by fabricating a high-rigidity member for vehicle formed of a martensite organization through a hot stamping mold process with a boron steel, and fabricating a metal organization provided a partial low-rigidity and an improved toughness.

(b) Description of the Related Art

Generally, various safety tests are performed in case of developing a new vehicle in a vehicle company in order to verify quality thereof based on whether the performance thereof satisfies a predetermined standard.

Since the safety relates life of a rider, it is very important for the vehicle to be verified, and then various countries applying a strict standard to the safety of the vehicle.

In this safety test, especially, a front side member of vehicle SM for preparing against frontal crash of the vehicles, as shown in FIG. 1, a bumper beam is mounted at a front end thereof through a crash box 1 and stay 3, and a dash panel 7 is welded to a center thereof and a front end of rearward assembled to a center side member 9.

The front side member SM transfers a residual collision energy F to the vehicle body after a primary collision energy F is absorbed by the bumper beam 5.

Meanwhile, a conventional front side member SM includes an inner member 11 and an outer member 13 formed of steel series of metal sheet pressed, and it is limited to satisfy the rigidity and light-weight at the same time.

Therefore, a new mold method and an ultra-light material capable of simultaneously providing high-rigidity and light-weight have been studied.

As a result of the studies for applying to the front side member SM, a roll forming replaced with a press stamping, and which can mold an ultra high-tensile force steel plate, and thereby a weigh thereof is reduced by 15% or more in comparison with a conventional press production.

Further, tailor welded blank which fabricates a customized blank having a different material, thickness, rigidity, and a tailor rolled blank technology, hydroforming technology molding integrally are applied.

Particularly, as shown in FIG. 2, hot stamping technology which is a hot press mold method using a boron steel plate 15 has been studied.

That is, the hot stamping is such a manner which the boron steel plate 15 is heated at a proper temperature (i,e. approximately 900° C.) so as to form the product in a press mold 17 at one time, and thereby the product is fabricated as a high-rigidity product 19 through a quick cooling.

Herein, the boron steel plate 15 is such as a steel plate where a little quantity of boron is added, and nucleation of free ferrite is suppressed in order to improve hardenability thereof by which the boron is segregated at an atomic level in austenite grain boundary under proper temperature, and decreases free energy in the austenite grain boundary.

As to the hot stamping mold, instead of the manner using a conventional high-rigidity steel, after the boron steel plate of ferrite organization having a tensile strength of 500 MPa to 800 MPa approximately before forming is formed at a temperature more than 900° C. through an austenitation, a martensite organization M having a high-tensile strength of 1300 MPa to 1600 MPa through a quick cooling is obtained.

Herein, the product formed by the hot stamping forming has an advantage of a light-weight and a high-rigidity through which a rigidity of the product may be 4 to 5 times more than that of normal steel plate, and also a weight thereof can be reduced by 40% comparably.

However, if the product formed by the hot stamping forming is applied to a bumper beam 5 which should absorb a collision energy effectively through improved rigidity in comparison with the conventional steel plate, or the front side member SM and like that, the absorption performance of collision energy is incomplete despite of a high-rigidity and a light-weight.

In case of the front side member SM, it is important for an absorption directivity of collision energy to evenly distributing the collision energy to the vehicle body.

Herein, in case of applying the front side member SM to high-rigidity through the hot stamping mold, safety of the vehicle is deteriorated due to partial buckling rather than sequential absorption.

The above information disclosed in this Background section is only for enhancement of understanding of the background of the invention and therefore it may contain information that does not form the prior art that is already known in this country to a person of ordinary skill in the art.

SUMMARY OF THE INVENTION

Therefore, after a member for vehicle having high-rigidity of martensite M organization which is made of boron steel plate is fabricated by a hot stamping forming, the martensite M organization is transformed to a ferrite P having a low-rigidity partially and improved toughness or to a metal organization heat treated by tempering process through induction heating or secondary heat treatment using laser beam LB of conduction area T2, and thereby collision absorption performance is improved by stabilizing the absorption directivity of the collision energy F without additional reinforcement.

A method for fabricating a member of vehicle by assembling an inner member and an outer member, the method may includes:

preparing each blanks which is made of a boron steel plate for the inner member and the outer member; forming the inner member and the outer member through a hot press forming at a temperature over transformation point with using the blanks; cooling respectively the inner member and the outer member formed by a hot forming with using a first cooling method so as to obtain a first metal organization having a high-rigidity; heating respectively pre-calculated position of the inner member and the outer member having a first metal organization of high-rigidity considering an directivity of an energy absorption to each transformation point secondarily through a heating source; cooling respectively the inner member and the outer member formed by the hot forming secondarily with using a second cooling method so as to obtain a second metal organization having a partial low-rigidity comparably; and assembling the inner member and the outer member together, and the members have the second metal organization partially in the first metal organization.

Further, the hot press forming may be such that the blanks are directly formed in a press mold heated higher than 900° C.

Further, the hot press forming may be such that the blanks are formed so that an area of final product for forming is more than 90% of an overall area, and then it is formed in the press mold heated higher than 900° C. as a finishing.

Further, the hot press forming may be such that the blanks is inserted into the press mold so as to form it in such a state that the blanks is heated in an electric furnace to a temperature more than 900° C. and stabilizes it in a predetermined time.

Further, the first cooling method may be such that a cooling passage where a coolant circulates in the press mold is formed so as to cool it quickly at a cooling rate of more than 57° C./sec.

Further, the first cooling method may be such as an oil cooling which quickly cools the member formed by the hot forming through which the oil directly injected therein in a velocity more than 57° C./sec.

Further, the first cooling method may be such as an air cooling which quickly cools the member formed by the hot forming through which the air forcedly injected therein in a velocity more than 57° C./sec.

Further, the first metal organization may be such as martensite organization.

Further, the heating source may be such as an induction heater performing an induction heating using high-frequency.

Further, the heating source may be such as a laser beam of conduction area of laser instrument.

Further, the second cooling method may be such as a slow cooling through natural cooling.

The second metal organization may be such as a ferrite organization.

DETAILED DESCRIPTION OF THE EMBODIMENTS

An embodiment of the present invention will hereinafter be described in detail with reference to the accompanying drawings.

Figure 1:
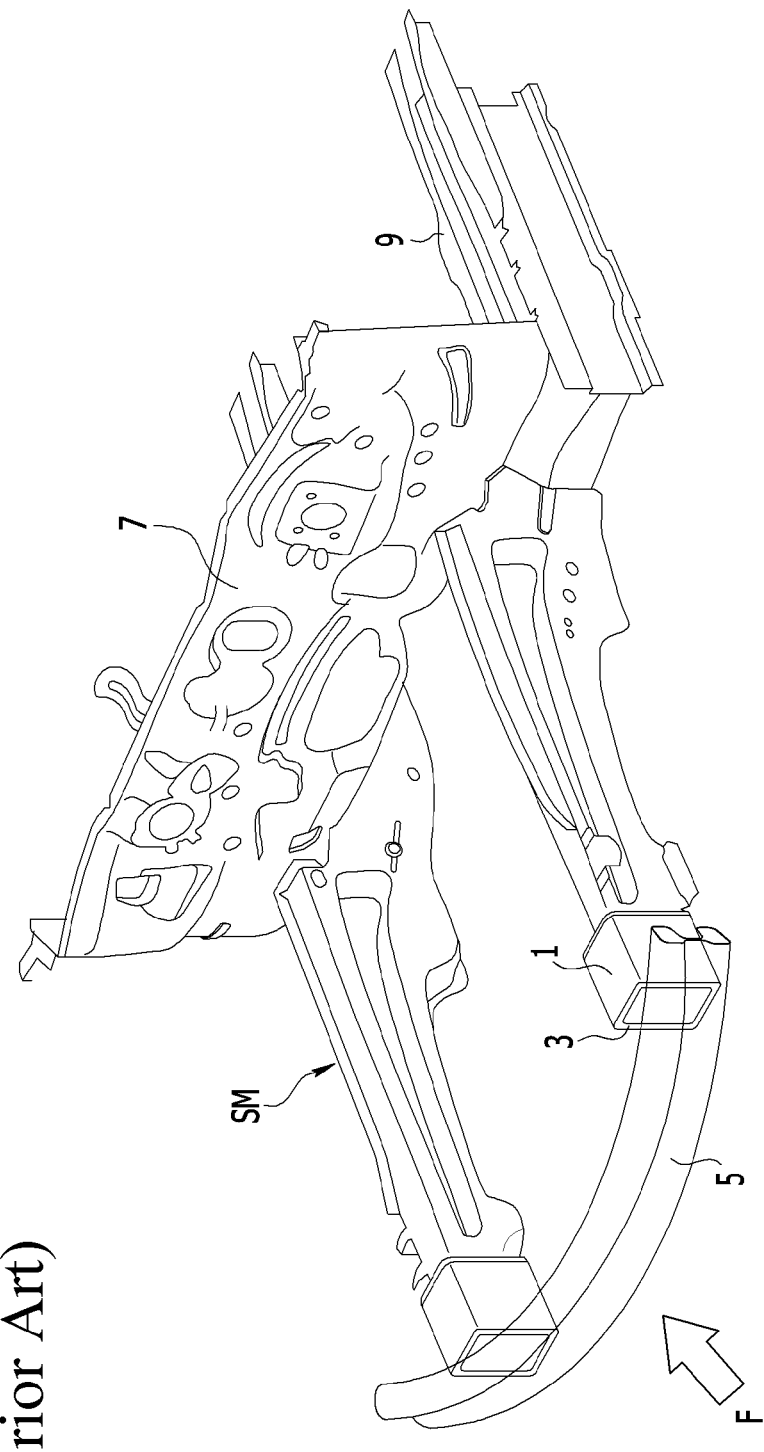
FIG. 1 is a perspective view of a conventional front side member.
Figure 2:
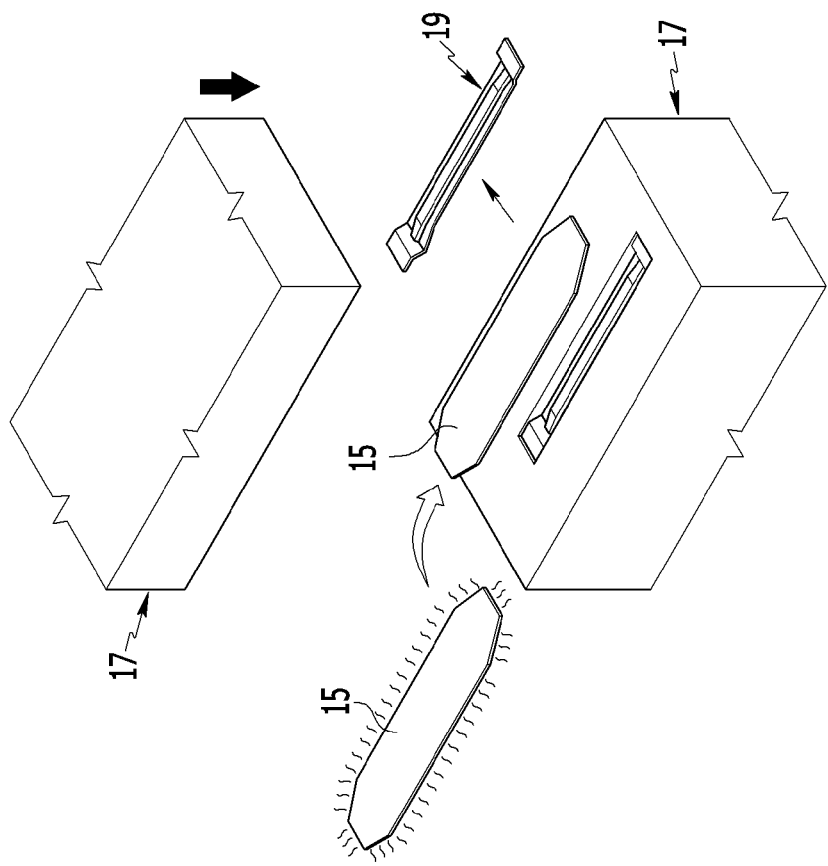
FIG. 2 is a schematic view of a conventional hot stamping process.
Figure 3:
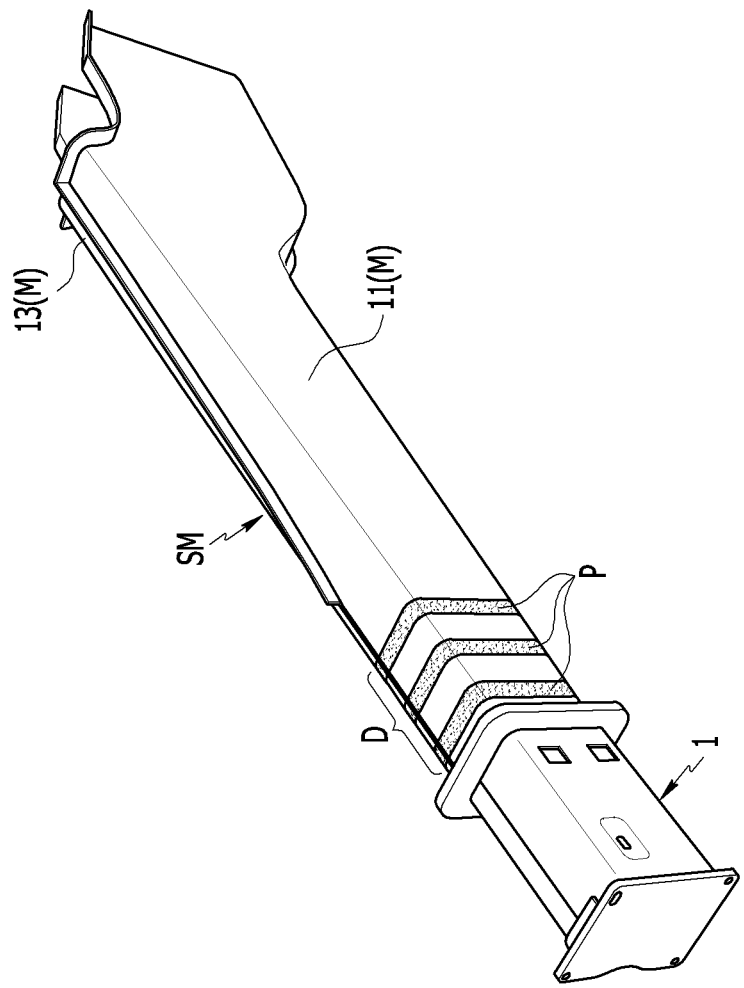
FIG. 3 is a perspective view of a front side member fabricated by a method for fabricating a member of vehicle according to an exemplary embodiment of the present invention.
Figure 5:
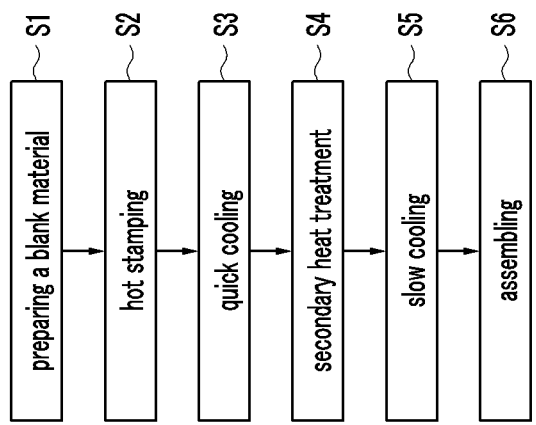
FIG. 5 is a block diagram showing a manufacturing process of a front side member for a vehicle according to an exemplary embodiment of the present invention.
Figure 6:
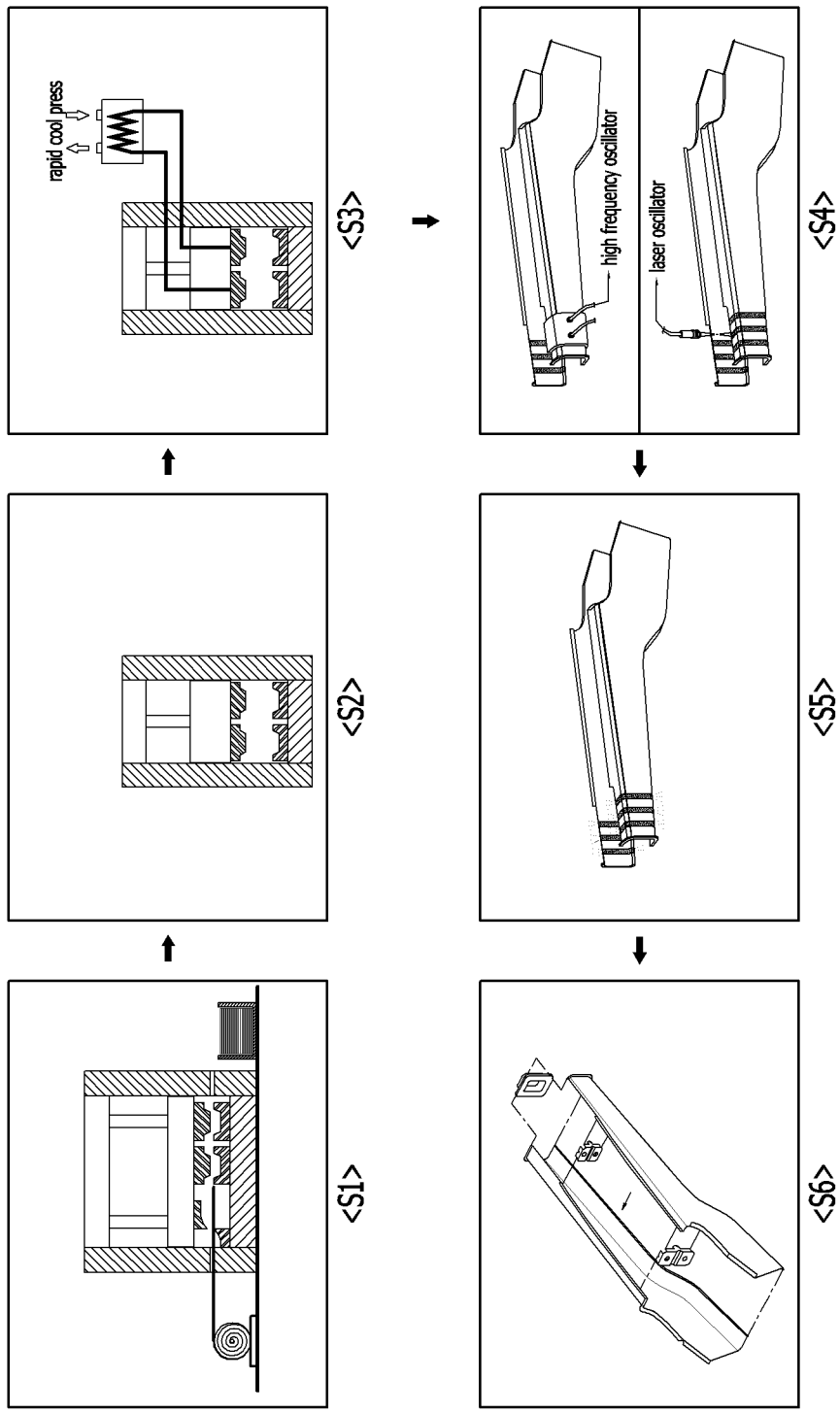
FIG. 6 is a manufacturing process of a front side member for a vehicle according to an exemplary embodiment of the present invention.

FIG. 3 is a perspective view of a front side member fabricated by a method for fabricating a member of vehicle according to an exemplary embodiment of the present invention, FIG. 5 is a block diagram showing a manufacturing process of a front side member for a vehicle according to an exemplary embodiment of the present invention, and FIG. 6 is a manufacturing process of a front side member for a vehicle according to an exemplary embodiment of the present invention.

Further, the drawings and descriptions are to be regarded as illustrative in nature and not restrictive. Like reference numerals designate like elements throughout the specification For giving an example of a method for fabricating a member of vehicle according to an exemplary embodiment of the present invention, as shown in FIG. 3, a front side member SM will be hereinafter described.

The front side member SM of vehicle should be formed in a press mold 17, and thereby after an inner member 11 and an outer member 13 are respectively fabricated, these are assembled together.

The front side member SM of vehicle according to an exemplary embodiment of the present invention may be a boron steel plate 15.

The boron steel plate may be formed of a steel plate which added by little quantity of boron, for example, such as boron steel (USIBOR 1500P) coated with Al+Si in order to prevent generation of oxide film as well-known 22MnB5.

Figure 4:
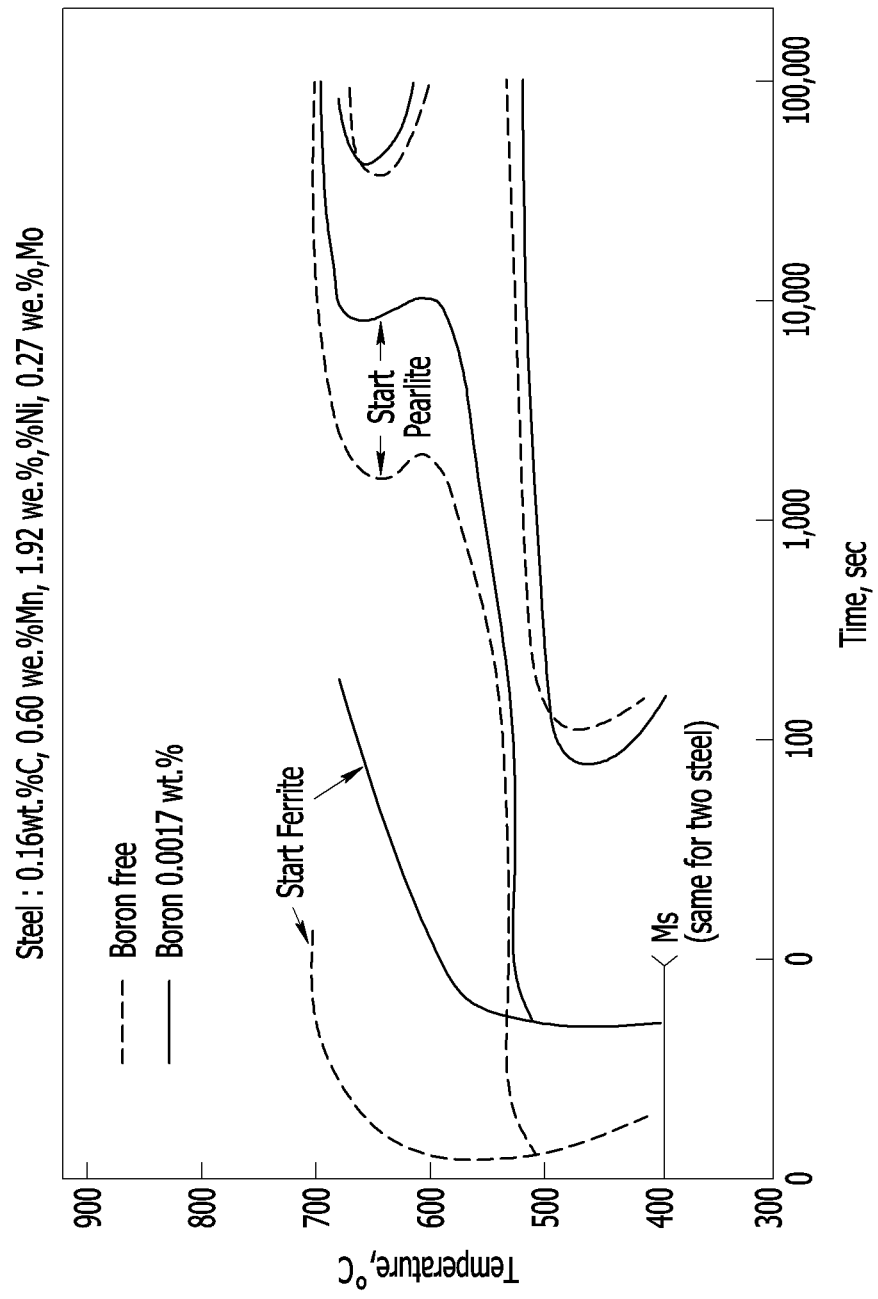
FIG. 4 is a time temperature transformation showing an effect according to an addition of boron

The boron steel 15, as shown in time temperature transformation of FIG. 4 showing the effect according to the boron added, it has advantages of retarding generation of martensite M metal material due to the boron added.

The boron steel plate 15 is such as a steel plate where a little quantity of boron is added, and nucleation of free ferrite is suppressed in order to improve hardenability thereof by which the boron is segregated at an atomic level in austenite grain boundary under a temperature condition of 900° C., and decreases a free energy in the austenite grain boundary.

Firstly, as shown in FIG. 5 and FIG. 6, blanks 21, 23 are prepared for respectively fabricating an inner member 11 and an outer member 13 such as a boron steel plate 15 in step S1.

And then, the blanks 21, 23 are formed by a method such as a hot stamping forming at a temperature more than 900° C. as a transformation point, that is, the inner member 11 and the outer member 13 are respectively formed by a hot press forming in step S2.

At this time, the hot press forming is such a manner that the blanks 21, 23 is directly inserted in the press mold 17 having a temperature more than 900° C. as transformation point so as to be formed directly, however, alternatively the blanks 21,23 can be indirectly formed such that an overall area of final product for forming is more than 90% temporarily, and then it can be formed in the press mold 17 having a temperature more than 900° C. finally.

In addition, a forming method that blanks 21, 23 heated by temperature of 900° C. (transformation point) in an electric furnace is inserted inside the press mold 17 can be applied.

And then, quick cooling step S3 is performed through which the inner member 11 and the outer member 13 formed by the hot press forming using the blanks 21, 23 are cooled quickly in order to make martensite organization having high-rigidity.

With this, the metal organization of the inner member 11 and the outer member 13 has ferrite (P) organization having 500-800 Mpa rigidity before forming, and then it is austenitized in a high temperature higher than 900° C. to have a martensite (M) organization having 1300-1600 Mpa rigidity by a quick cooling.

Herein, the inner member 11 and the outer member 13 formed in the hot press forming can be quickly cooled in a velocity of 57° C./sec more faster velocity through a cooling passage formed inside the press mold 17 where a coolant is recirculated therein.

Alternatively, an oil cooling directly injecting an oil to the inner member 11 and outer member 13 formed by a hot forming and cools quickly it in a 57° C./sec velocity can be applied.

Further, in case where the oil is difficult to be applied, a method in such that air is forcedly injected in a velocity more than 57° C./sec.

After the hot press forming like the above, at step S4 as secondary heating is performed, that is, each pre-calculated position of the inner member 11 and the outer member 13 formed of martensite having a high-rigidity due to quick cooling are heated to a temperature of 900° C. as a transforming point through a heating source according to the energy absorption directivity.

At this time, the energy absorption directivity indicates collapse direction of the members according to an collision energy absorption so as to distribute the collision energy exerting the vehicle body by inducing the collision energy to exert toward rearward sequentially rather than incline to one side thereof in case of collapse due to absorption of the collision energy on the inner member 11 and the outer member 13.

Herein, the heating source may be a high-frequency induction heater 30, alternatively, laser beam LB of conduction area of defocus area irradiated by a laser instrument 40.

Thus, the induction heating respectively heats the inner member 11 and the outer member 13 by using magnetic induction of high-frequency current, and it may be fabricated according to heat spot or heat pattern in order to configure a shape of the induction heater 30.

Figure 7:
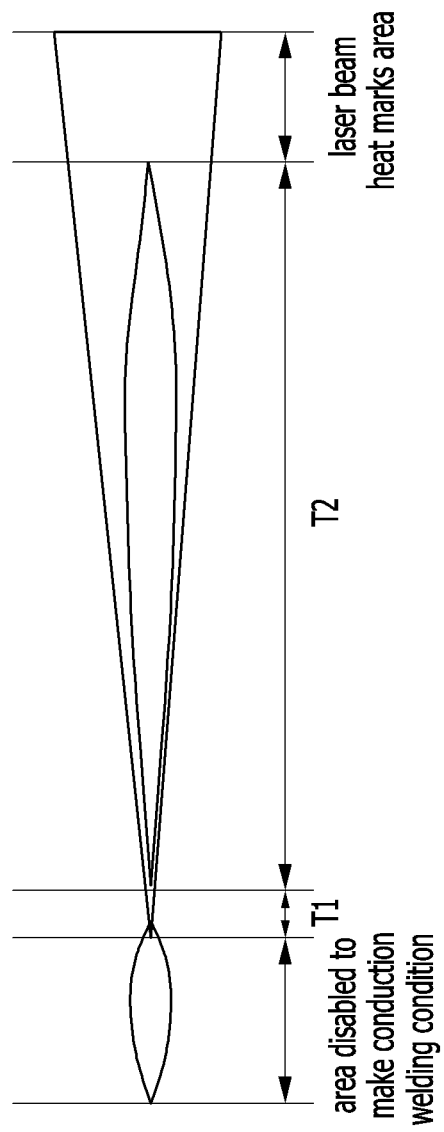
FIG. 7 is a schematic view showing a focusing area of laser beam.

Meanwhile, the laser beam LB of the conduction area T2 is a laser beam of defocus area, as shown in FIG. 7, which is several times a focus size of a key hole area T1.

In this case, although density of the laser beam LB is much lower than that of the focus position, in a moment that it strikes a surface of the boron steel plate 15 it heated by thermal conduction, and thereby the steel plate is sufficiently heated by using a density of energy in different shape with laser beam LB of the key hole area T1.

Like this, the inner member 11 and the outer member 13 heated by the laser beam LB of induction heating or conduction area T2 to a temperature of 900° C. as a transformation point disposed at a position according to energy absorption directivity is cooled by natural cooling, and a ferrite having a partial low-rigidity obtained in step S5.

Figure 8:
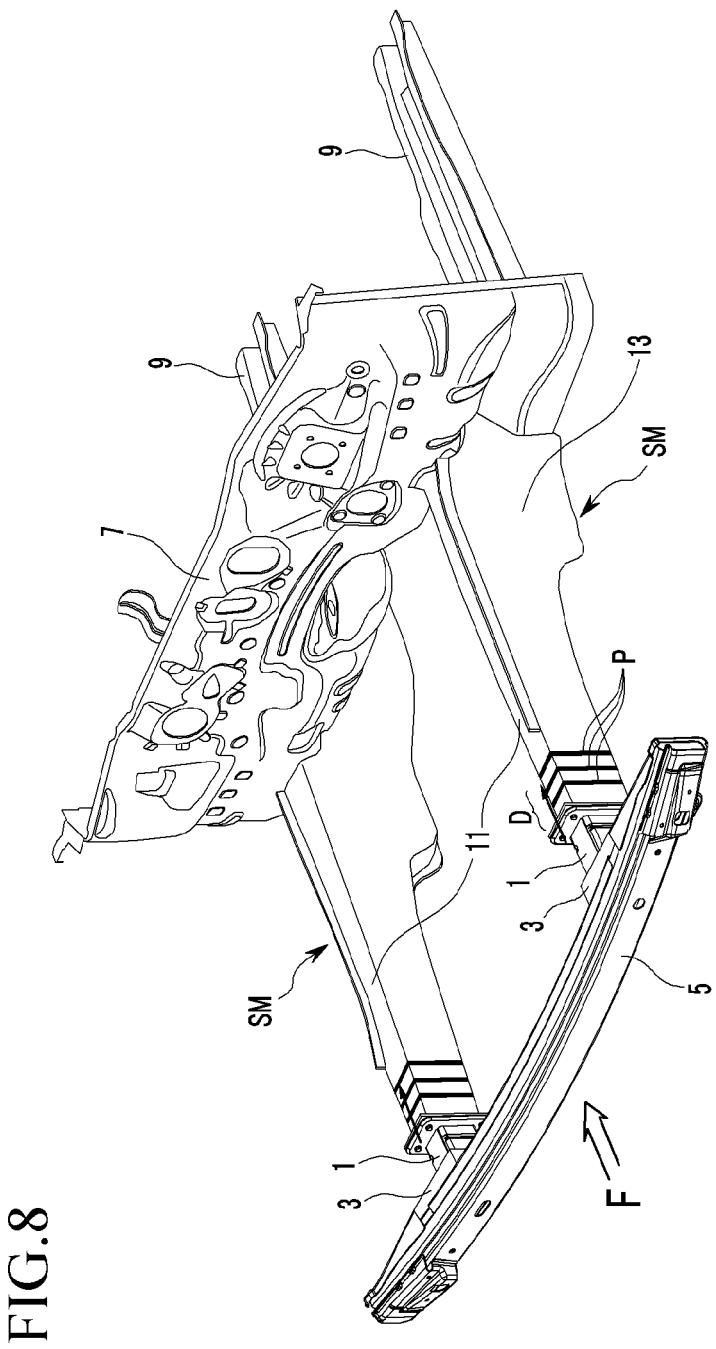
FIG. 8 is a perspective view of a front side member for a vehicle fabricated by a method for fabricating a member of vehicle according to an exemplary embodiment of the present invention.

At this time, as shown in FIG. 8, the position according to an energy absorption directivity of the inner member 11 and the outer member 13 is such as a position where a frontal collision energy F transferred through the bumper beam 5 and the crash box 1.

That is, when the inner member 11 that an overall metal organization thereof is formed as martensite M organization having a high-rigidity and a rigidity of 2 to 3 places of an each frontal predetermined area D of the outer member 13 is decreased and transformed to a ferrite P metal organization increasing a toughness thereof, an absorption directivity of a collision energy F is stabilized rearwardly through preventing the collision energy F transferred from front side to bend, and it is collapsed at the each ferrite metal organization.

As can be seen from the foregoing, after 2 to 3 places along predetermined front portion on the inner member 11 and the outer member 13 of martensite M metal organization having high-rigidity is transformed to ferrite P metal organization having a low-rigidity in comparison with the others, the inner member 11 and the outer member 13 are assembled each other by welding a front plate 25 and support plate 27 therein in order to complete a fabricating a front side member SM of vehicle in step S6.

Firstly, a member for vehicle having high-rigidity of martensite M organization is fabricated by a hot stamping forming method. At this time, the material thereof may be a boron steel plate 15.

Subsequently, the martensite M organization is transformed to a ferrite P having the low-rigidity partially and improved toughness or to a metal organization heat treated by tempering process through induction heating or secondary heat treatment using laser beam LB of conduction area T2 according to energy absorption directivity.

With this, collision absorption performance is improved by stabilizing the absorption directivity of the collision energy F without additional reinforcement.

Especially, when a front side member is fabricated through the method for fabricating a member of vehicle, a problem caused by buckling phenomenon in case of collision included in the conventional hot stamping material is solved, and thereby collision energy absorption performance is stabilized.

As can be seen from the foregoing, after a member for vehicle having high-rigidity of martensite M organization which is made of boron steel plate is fabricated by a hot stamping forming, the martensite M organization is transformed to a ferrite P having a low-rigidity partially and improved toughness or to a metal organization heat treated by tempering process through induction heating or secondary heat treatment using laser beam LB of conduction area T2, and thereby collision absorption performance is improved by stabilizing the absorption directivity of the collision energy F without additional reinforcement.

Further, a complicated forming of bead required for enhancing rigidity about a collision direction is not necessary, and thereby manufacturing cost for designing can be decreased.

As a result, safety concern of vehicle is satisfied through which it can provide high-rigidity and light-weight simultaneously, instead of conventional product formed by a stamping forming method, and further it can improve absorption performance and it also can reduce absorption directivity so as to induce the collision energy to be absorbed sequentially.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for fabricating a member of a vehicle by assembling an inner member and an outer member, the method comprising:

preparing blanks, each of which is made of a boron steel plate, for the inner member and the outer member;

forming the inner member and the outer member by a hot press forming process at a temperature that is equal to or higher than a transformation point using the blanks;

cooling the inner member and the outer member formed by the hot press forming process by a first cooling method so as to obtain a first metal organization having a high-rigidity;

heating, for a second time, a pre-calculated position of each of the inner member and the outer member having the first metal organization of high-rigidity, in consideration of a directivity of energy absorption, up to the transformation point through a heating source;

cooling, for a second time, the inner member and the outer member formed by the hot press forming process by a second cooling method so as to obtain a second metal organization partially having a relatively low-rigidity; and assembling the inner member and the outer member partially having the second metal organization in the first metal organization.

2. The method of claim 1, wherein the hot press forming process is such that the blanks are directly formed in a press die that is heated to a temperature that is equal to or higher than 900° C.

3. The method of claim 1, wherein the hot press forming process is such that the blanks are initially formed at a normal temperature so that more than 90% of a final product is formed, and then the final product is formed in a press die heated to a temperature that is equal to or higher than 900° C.

4. The method of claim 1, wherein the hot press forming process is such that the blanks are heated in an electric furnace to a temperature that is equal to or higher than 900° C., stabilized for a predetermined time, and inserted into a press die so as to form the inner member and the outer member.

5. The method of claim 1, wherein the first cooling method is such that a cooling passage where a coolant circulates is formed in a press die so as to cool the inner member and the outer member rapidly at a cooling rate that is equal to or higher than 57° C./sec.

6. The method of claim 1, wherein the first cooling method comprises cooling with oil such that the inner member and the outer member formed by the hot press forming process are cooled rapidly at a cooling rate that is equal to or higher than 57° C./sec by being directly sprayed with the oil.

7. The method of claim 1, wherein the first cooling method comprises cooling with forced air such that the inner member and the out member formed by the hot press forming process are cooled rapidly at a cooling rate that is equal to or higher than 57° C./sec by being directly sprayed with the forced air.

8. The method of claim 1, wherein the first metal organization comprises a martensite organization.

9. The method of claim 1, wherein the heating source comprises high-frequency induction heating generated by a high-frequency induction heater.

10. The method of claim 1, wherein the heating source comprises a laser beam generated at a conduction area of a laser instrument.

11. The method of claim 1, wherein the second cooling method comprises slow cooling with natural air.

12. The method of claim 1, wherein the second metal organization comprises a ferrite organization.

13. A method for fabricating a member of a vehicle by assembling an inner member and an outer member, the method comprising:

preparing blanks for the inner member and the outer member with a boron steel plate;

forming the inner member and the outer member by subjecting the blanks to a hot press forming process in a press die that is heated to a temperature that is equal to or higher than 900° C.;

cooling the inner member and the outer member formed by the hot press forming process rapidly at a cooling rate that is equal to or more than 57° C./sec so as to obtain a martensite metal organization having a high-rigidity;

heating, for a second time, a pre-calculated position of each of the inner member and the outer member having the martensite metal organization of high-rigidity, in consideration of an energy absorption directivity, up to a transformation point through induction heating with a high-frequency induction heater;

cooling the inner member and the outer member heated for the second time slowly by natural air cooling so as to allow the inner member and the outer member to have a ferrite metal organization having a relatively low-rigidity partially; and assembling the inner member and the outer member partially having the ferrite metal organization in the martensite metal organization.

14. A method for fabricating a member of a vehicle by assembling an inner member and an outer member, the method comprising:

preparing blanks, each of which is made of a boron steel plate, for the inner member and the outer member;

initially forming the blanks in a press die at a normal temperature such that more than 90% of a final product is formed;

forming the inner member and the outer member by a finalizing hot press forming process in the press die that is heated to a temperature that is equal to or higher than 900° C.;

cooling the inner member and the outer member formed by the hot press forming process rapidly at a cooling rate that is equal to or more than 57° C./sec so as to obtain a martensite metal organization having a high-rigidity;

heating, for a second time, a pre-calculated position of each of the inner member and the outer member having the martensite metal organization up to a transformation point by induction heating with a high-frequency induction heater;

cooling the inner member and the outer member heated for the second time slowly by natural cooling so as to allow the inner member and the outer member to have a ferrite metal organization having a relatively low-rigidity partially; and assembling the inner member and the outer member partially having the ferrite metal organization in the martensite metal organization.

* * * * *